United States Patent
Melhorn et al.

(10) Patent No.: US 7,520,086 B2
(45) Date of Patent: Apr. 21, 2009

(54) DEVICE FOR IN-LINE, ROTATING CHUM AND/OR FISH SCENT DISPENSER

(76) Inventors: Terry Melhorn, P.O. Box 31, Dallastown, PA (US) 17313; Jessica Melhorn, 404 Essex Ct., Lansdale, PA (US) 19446

( * ) Notice: Subject to any disclaimer, the term of this patent is extended or adjusted under 35 U.S.C. 154(b) by 0 days.

(21) Appl. No.: 11/347,592

(22) Filed: Feb. 4, 2006

(65) Prior Publication Data

US 2006/0174534 A1    Aug. 10, 2006

Related U.S. Application Data

(60) Provisional application No. 60/651,023, filed on Feb. 8, 2005.

(51) Int. Cl.
*A01K 85/01* (2006.01)
*A01K 97/02* (2006.01)

(52) U.S. Cl. ..................... 43/42.06; 43/44.99

(58) Field of Classification Search ............... 43/42.06, 43/44.99, 42.19, 42.2, 42.21
See application file for complete search history.

(56) References Cited

U.S. PATENT DOCUMENTS

| | | | | |
|---|---|---|---|---|
| 1,913,362 A | * | 3/1933 | Catarau | 43/42.06 |
| 2,465,127 A | * | 3/1949 | Stark | 43/44.99 |
| 2,626,478 A | * | 1/1953 | Folmer | 43/42.19 |
| 2,748,522 A | * | 6/1956 | Mulcahey | 43/42.06 |
| 2,749,647 A | * | 6/1956 | Beloff | 43/42.06 |
| 2,750,703 A | * | 6/1956 | Puste | 43/42.21 |
| 2,769,268 A | | 11/1956 | Miller | |
| 3,036,400 A | * | 5/1962 | Anderson | 43/55 |
| 3,434,230 A | * | 3/1969 | Littlefield | 43/42.06 |
| 4,133,134 A | | 1/1979 | Cheng | |
| 4,205,476 A | * | 6/1980 | Hsu | 43/42.06 |
| 4,553,348 A | * | 11/1985 | Cooper | 43/42.06 |
| 4,603,502 A | | 8/1986 | MacDonald | |
| 4,676,020 A | | 6/1987 | Taylor et al. | |
| 4,930,245 A | | 6/1990 | Bazzano | |
| 4,959,921 A | | 10/1990 | Stanish et al. | |
| 4,962,609 A | | 10/1990 | Walker | |
| 5,097,620 A | | 3/1992 | Nietupski | |
| 5,560,140 A | | 10/1996 | Nafziger, Jr. | |
| 5,617,669 A | | 4/1997 | Levey | |
| 5,720,124 A | | 2/1998 | Wentzell | |
| 6,138,400 A | | 10/2000 | Gervae | |
| 6,176,035 B1 | * | 1/2001 | Somogyi | 43/42.14 |
| 6,442,887 B2 | | 9/2002 | Sanquist | |

(Continued)

*Primary Examiner*—Kimberly S Smith

(57) ABSTRACT

A fish chum and/or fish scent dispenser device is described which provides a means to distribute scent into the water so as to attract fish to the proximity of the fisherman and to specifically attract fish to baited hooks or to the lure being used by the fisherman. A typical implementation is that of a dispenser 20 attached to fishing lines 19A and 19B, using swivel-type mechanisms 18A and 18B to prevent fishing line twist, which dispenser includes front and rear finned units 11A and 11B, a main fish scent or chum holding cavity 1, and an access door 8. Fish scent or chum material, located in main cavity 1, may be rapidly or slowly dissolved in the water, depending on the speed of rotation, the size of holes 6, and the type of scent material used, as dispenser 20 is pulled through the water or as the force of the water, for example, without limitation, currents or waves, react against fin units 11A and 11B, causing dispenser 20 to spin or rotate.

20 Claims, 3 Drawing Sheets

U.S. PATENT DOCUMENTS

| | | | |
|---|---|---|---|
| 6,453,602 B1 * | 9/2002 | Russell et al. | 43/100 |
| 6,516,554 B1 | 2/2003 | Page | |
| 6,530,171 B2 | 3/2003 | Stevens | |
| 6,779,293 B1 * | 8/2004 | Rice | 43/42.06 |
| 6,836,997 B2 | 1/2005 | Cramsey | |
| 6,922,937 B1 * | 8/2005 | Gilbert | 43/42.06 |
| 6,993,866 B1 * | 2/2006 | Strange | 43/42.31 |
| 7,043,870 B1 | 5/2006 | Sydow | |
| 7,114,280 B2 * | 10/2006 | Turner | 43/17.6 |
| 7,380,365 B2 * | 6/2008 | Noraker | 43/42.06 |
| 7,392,613 B2 * | 7/2008 | Boozer et al. | 43/44.99 |
| 7,448,159 B2 * | 11/2008 | Berge | 43/42.06 |
| 2004/0068916 A1 | 4/2004 | Harris | |
| 2004/0093787 A1 | 5/2004 | Kutzner | |

* cited by examiner

DEVICE FOR IN-LINE, ROTATING CHUM AND/OR FISH SCENT DISPENSER

CROSS-REFERENCE TO RELATED APPLICATIONS

The present Utility patent application claims priority benefit of the U.S. provisional application for patent No. 60/651,023, entitled "In-Line Rotating Chum and/or scent dispenser" filed on Feb. 8, 2005 under 35 U.S.C. 119(e). The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to fishing bait distributors, or chumming devices. More particularly, the invention relates to a fish chum or fish scent dispenser device provided to distribute scent into the water so as to attract fish to the proximity of the fisherman and to specifically attract fish to baited hooks or to the lure being used by the fisherman.

BACKGROUND OF THE INVENTION

Recreational or sport fishing has constantly been increasing in popularity. What once was just a summertime hobby has become a yearlong activity for tens of millions worldwide. Many fishermen choose to engage in a very leisurely type of fishing that involves casting a fishing line, connected to baited hook(s) and a sinker-type device, into the water, to sit at a certain spot, while hoping to attract fish near that spot, through visual contact with the bait, or by the fish being attracted to the scent of the bait. Still other fishermen may use lures containing small amounts of scent or chum, or lures and bait, to attract fish to their hooks. The practice of chumming involves the introduction of large amounts of scented solid, particulate or liquid matter, into the water, in hopes of that particular scent will be attractive to many fish sought to be caught by a fisherman. Chumming has mostly been practiced from boats with several fishermen on board, and is a time proven method of attracting fish to the hooks or lures, to be caught by those fishermen.

Chum can consist of ground up fish parts and blood, food particles, or any other substance that is able to introduce a fish attracting scent into the water. Traditionally, chum is ladled into the water or put into the water in cloth bags. Then, the scent is pushed by the water currents into a much larger area than the scent of the fisherman's bait could cover. The result is a scent slick that attracts fish from a large area. This large area of fish-attracting scent dramatically increases the chances of catching fish as opposed to only relying on the scent from small pieces of bait to attract fish. Chum may be used in salt water or fresh water.

Large scale chumming has never been a practical answer for the individual fishermen. And many fish scent or chum-dispensing devices are too large and clumsy for the individual fisherman to use. Many known fish scent or chum-dispensing devices are not optimized to quickly and widely dispense fish scent or chum. The sooner fish-attracting scent is introduced to a wide area, the sooner the fish may be attracted and caught by the fisherman. Water does not easily flow into and out of current dispenser devices. It is often difficult to replace the fish scent, or chum, in current dispenser devices. Also, it is important to be able to timely refill the scent-dispensing device, to keep the device in the water, attracting more fish to be caught.

Therefore, there is a need in the art for an improved fish scent dispenser that is smaller than current dispensers, quickly spreads the fish scent, allows water to easily flow into and out of the device, and is easy to refill and use.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an orientation of the fish scent dispenser that shows a latching mechanism that may be used to lock the access door, to the main cavity. FIG. 2 illustrates an orientation of the fish scent dispenser that shows the door-hinging mechanisms. FIG. 3 illustrates an orientation of the fish scent dispenser that shows the interior of the main cavity;

Figure 1:
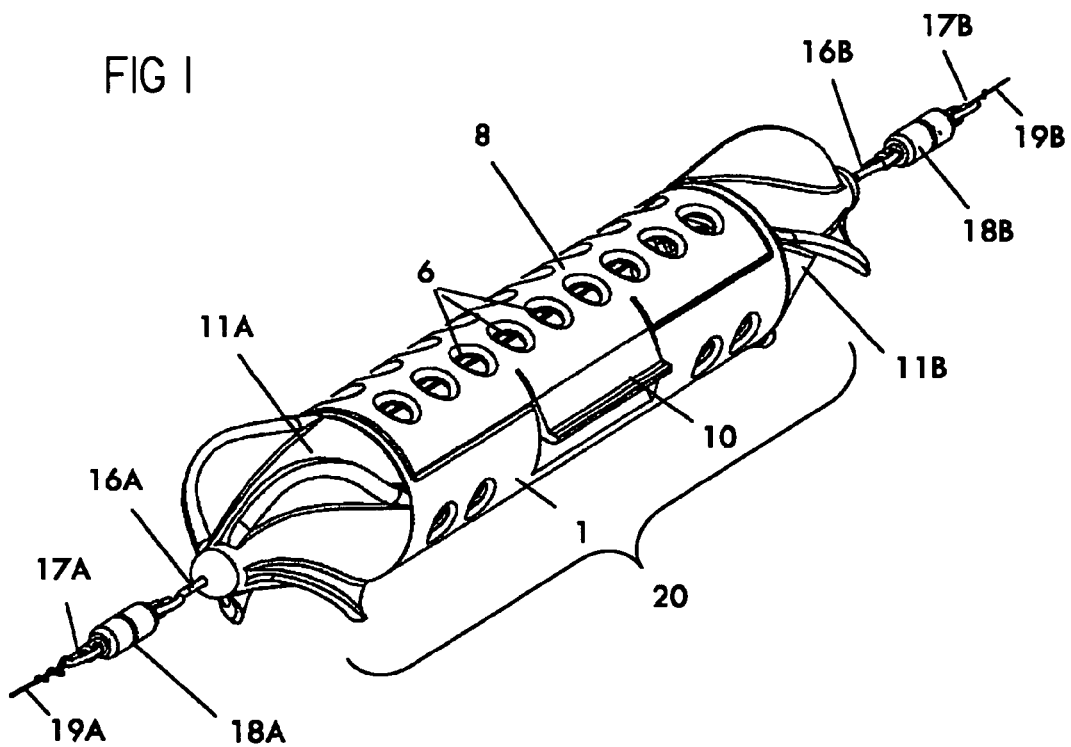
FIG. 1, FIG. 2 and FIG. 3 illustrate perspective views of an exemplary fish scent or chum dispenser attached to a fishing line, using swivel-type mechanisms to prevent fishing line twist, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a device for in-line, rotating chum or fish scent dispenser is described.

It is an aspect of the invention to provide a fish scent or chum dispenser to rapidly distribute scent that attracts fish to the close proximity of the fisherman and specifically to the baited hooks or the lure being used by the fisherman.

Other aspects of the present invention are to provide a fish scent dispensing device that decreases the time of fish scent dispersal and increases the area of fish scent dispersal, and that may allow water to easily flow in to and out of the dispenser, and that easily allows the replacement of the fish scent or chum, into the dispenser.

It is yet a further aspect of the present invention to provide a fish scent dispensing device that initially rapidly releases chum or a fish attracting scent and will also release fish attracting chum or scent over an extended period of time.

It is still another aspect of the present invention to provide a fish scent or chum dispensing device that is economical to manufacture and easy to use.

It is a still further aspect of the present invention to provide a fish scent or chum dispensing device that attaches to a fishing line near baited hooks or near a fishing lure.

It is a yet still further aspect of the present invention that the fish chum or scent dispenser may be attached to a fishing line in a reverse manner and will continue to function in the correct manner.

One embodiment of the invention provides a fish chum or scent dispenser, for attaching to a fishing line and dispensing fish scent into the water, comprising: a front fin unit and a rear fin unit, the front and rear units abutting to the main chum or scent storage cavity and attached to the main chum or scent storage cavity by snap locking mechanisms, glue, or by other means; an access door attached to the main chum or scent storage cavity to provide easy access to refill the main chum or scent storage cavity; a leader that passes through the entire unit, through holes in the center of both fin units and through holes in the center of the main storage cavity, which will create a horizontal axis, on which the present embodiment may spin or rotate; swivel-type devices, attached to the leader, at the outer end of each of the fin units, that may allow for rapid spinning of the present embodiment, while not causing the fishing line to twist; a fish chum or scent material, located in the main storage cavity that may be rapidly or slowly dissolved in the water, as the scent dispenser is pulled through the water or as the force of water currents or waves, react against the fin units, causing the unit to spin or rotate.

A particular embodiment of the invention provides rotating means that are front and back fin units. Each fin unit may consist of one or more separate fins. Each fin may be of a curved blade design, convex on one side of the fin, concave on the other side, so as to rotate or spin the entire present embodiment, when water is forced over the present embodiment, from a direction parallel or perpendicular to the horizontal axis or from nearly any other direction. This embodiment may further comprise a leader, made of wire, nylon or other material, extending through the front fin unit, through the main storage cavity and through the rear fin unit. Wherein the leader may be attached by swivel type units, with a ring at either end of the swivel-type units, one ring to attach to the leader, the other ring to attach the fish line to the fishing reel or the fish line to the hooks. Wherein the attaching means may be a hole in the center of each of the fin units and holes in the center of each of the ends of the main storage cavity, along the longitudinal axis to therefore allow the leader to be threaded through each hole.

An aspect of a particular embodiment of the invention is to provide the rotating or spinning means of fin units located at the front and rear of the invention, each fin unit comprising at least one fin, of a curved blade design, convex on one side of the fin, concave on the other side of the fin.

An aspect of an embodiment of the present invention is to provide a center hole in each of the fin units, a center hole in each end of the main storage cavity, all said holes to have an entrance and exit opening. And to have a plurality of holes formed in the exterior walls of the main storage cavity and the surface of the access door.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

Figure 2:
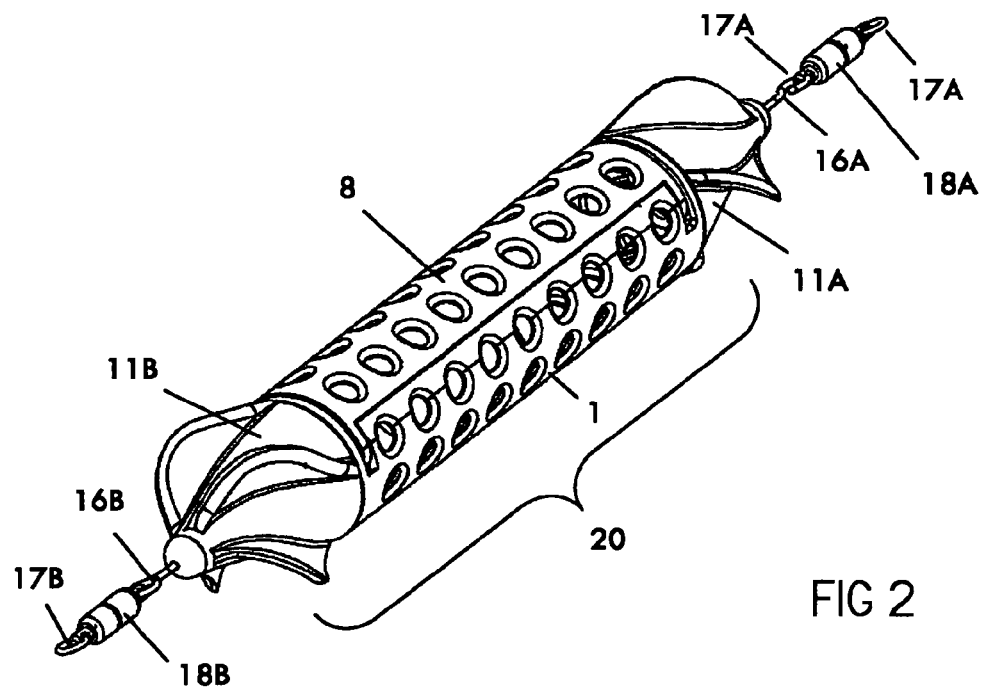
Figures 3, 4:
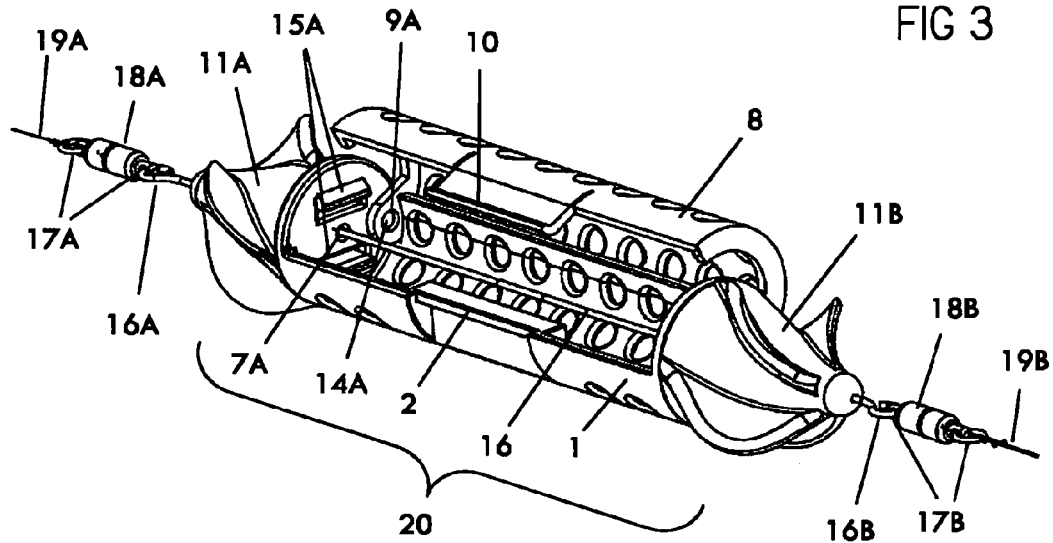
FIG. 4 shows an exploded view of an exemplary fish scent or chum dispenser without swivel-type mechanisms, horizontal-axis leader or fishing line, in accordance with an embodiment of the present invention.

FIG. 1, FIG. 2 and FIG. 3 illustrate perspective views of an exemplary fish scent or chum dispenser 20 attached to fishing lines 19A and 19B, using swivel-type mechanisms 18A and 18B to prevent fishing line twist, in accordance with an embodiment of the present invention. FIG. 1 illustrates an orientation of fish scent dispenser 20 that shows a latching mechanism that may be used to lock an access door 8, to a main cavity 1. FIG. 2 illustrates an orientation of fish scent dispenser 20 that shows the door-hinging mechanisms. FIG. 3 illustrates an orientation of fish scent dispenser 20 that shows the interior of main cavity 1. In the present embodiment, rotating fish scent or chum dispenser 20 comprises front and rear finned units 11A and 11B, main fish scent or chum holding cavity 1, and access door 8, as shown in FIG. 1. Fishing lines 19A and 19B are attached, to dispenser 20 using swivel type mechanisms 18A and 18B, to prevent fishing line twist, and leader sections 16A and 16B. In some embodiments, the swivel type devices may be built into dispenser 20, at the ends of leader sections 16A and 16B, or used separately. In the present embodiment, finned, rotating dispenser 20 will be used as an in-line device, where fishing line 19A, emanating from the fishing reel, is attached at the front end of dispenser 20 with leader section 16A, using swivel-type mechanism 18A. The trailing end of dispenser 20 is attached to fishing line 19B, which holds the hooks, sinker or other fishing-type lures, via leader section 16B and swivel-type mechanism 18B.

In the present embodiment, fin units 11A and 11B abut main cavity 1. Access door 8 attaches to main cavity 1 and provides easy access to refill main cavity 1. Access door 8 is held in the closed position by a latch mechanism comprising a latch 10 and a slot 2. Latch 10 slides into and is held in place by slot 2, keeping access door 8 in the closed position. A leader 16 passes through dispenser 20, through holes 13A and 13B in the center of both fin units 1A and 11B and through holes 7A and 7B in the center of the end walls of main cavity 1 along the longitudinal axis of dispenser 20, which will create a horizontal axis on which dispenser 20 may spin or rotate. Swivel-type devices 18A and 18B, attached to leader sections 16A and 16B, at the outer end of fin units 11A and 11B, may allow for rapid spinning of dispenser 20 while not causing the fishing line to twist.

In the present embodiment, the attaching means for fishing lines 19A and 19B are swivel type units 18A and 18B, with rings 17A and 17B at either end of swivel-type units 18A and 18B, one ring to attach to leader sections 16A or 16B, the other ring to attach to fishing line 19A or 19B. To allow the fish scent or chum to escape main cavity 1 and reach the water to attract fish, dispenser 20 has a plurality of holes 6 formed in the exterior walls of main cavity 1 and the surface of access door 8. The placement of holes 6 throughout the entire body of dispenser 20 allows for a quick but controlled release of scent. Fish scent or chum material, located in main cavity 1, may be rapidly or slowly dissolved in the water, depending on the speed of rotation, the size of holes 6, and the type of scent material used, as dispenser 20 is pulled through the water or as the force of the water, for example, without limitation, currents or waves, react against fin units 11A and 11B, causing dispenser 20 to spin or rotate.

Figure 5:
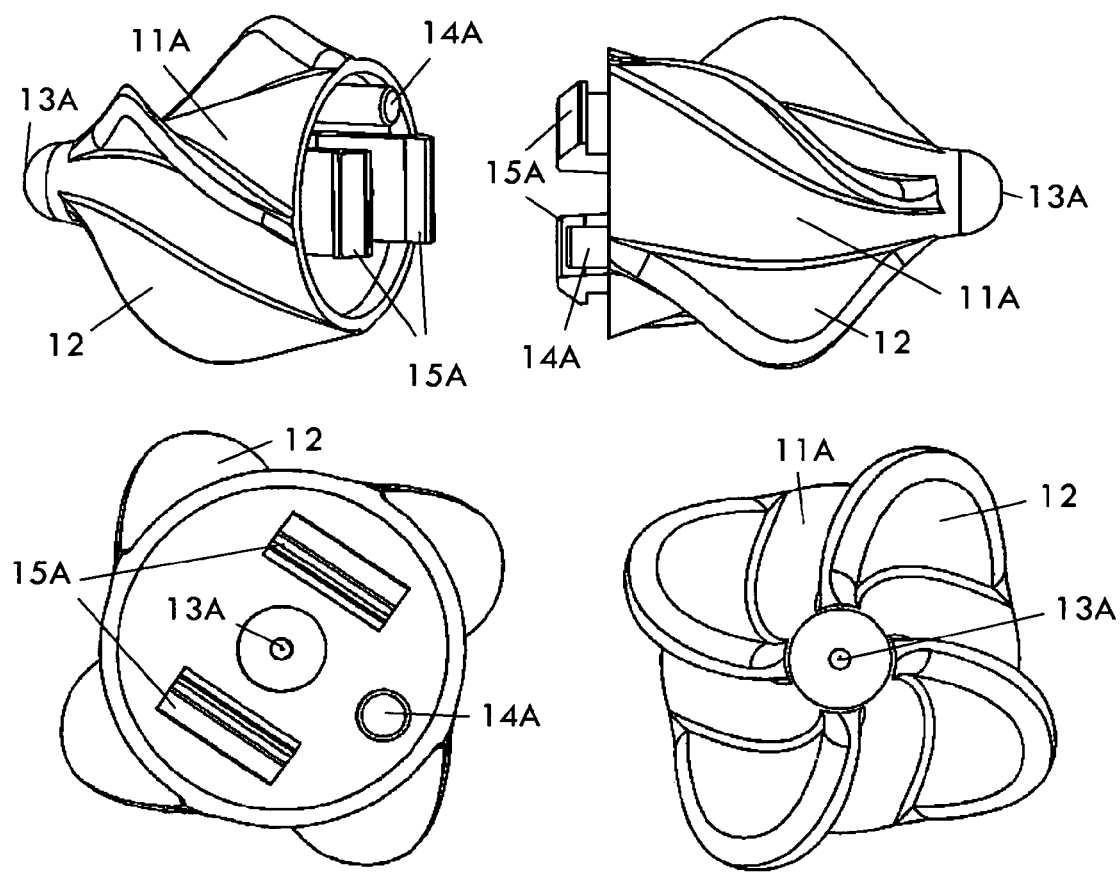
FIG. 5 illustrates detailed views of exemplary fin units from a fish scent dispenser, in accordance with an embodiment of the present invention.

FIG. 4 shows an exploded view of an exemplary fish scent or chum dispenser 20 without swivel-type mechanisms or fishing line, in accordance with an embodiment of the present invention. In the present embodiment, fin units 11A and 11B may attach to the end walls of main cavity 1, via snap-in latch mechanisms 15A and 15B, through formed holes 3A and 3B, as shown in FIG. 4 and FIG. 5, in the ends of main cavity 1. In alternate embodiments, any other effective attachment means may be used to attach fin units 11A and 11B to main cavity 1 such as, but not limited to, other latching mechanisms, glue, threaded sections for screwing the pieces together, etc. In the present embodiment, possible integrated hinge pins 14A and 14B may be formed within fin units 11A and 11B and may pass through formed holes 4A and 4B in the end pieces of main cavity 1 and mate to formed holes 9A and 9B in the hinge of access door 8, creating a door pin.

FIG. 5 illustrates detailed views of exemplary fin units 11 from a fish scent dispenser, in accordance with an embodiment of the present invention. In the present embodiment, fin units 11A and 11B may comprise one or more separate fins 12. Each fin 12 may be of a curved blade design, convex on one side of the fin, concave on the other side, so as to rotate or spin the entire body of dispenser 20 when water is forced over dispenser 20 from a direction parallel or perpendicular to the horizontal axis or from nearly any other direction. Fin units 11A and 11B have curved blades, so that when dispenser 20 is pulled through the water by the fisherman's line, or as any of water's natural forces act upon fins 12, for example, without limitation, wave action, water currents, etc., fins 12 act to spin or rotate dispenser 20, about its horizontal axis, which is leader 16. In this way, a rotational torque can be imparted to rotate the main cavity even when the present device is used in non-trolling-type fishing applications.

The spinning effect of dispenser 20, as it rotates in the water, dramatically increases dispersion of chum and/or scent particles such as, but not limited to, flaked chum, pelleted fish chum, scent-absorbing balls, salmon eggs, other commercial scented baits, any other commercial or natural bait, or scent absorbing sponges, foam or wool, from within main cavity 1, through venting holes 6, quickly broadcasting a wide scent trail or scent slick, into the water. Centrifugal forces, water pressure differentials between the interior and exterior of fish scent or chum dispenser 20, and diffusion all combine to quickly disperse the scent or chum particles into a large area, where fish can sense them.

In a typical application, the user fills dispenser 20 by opening access door 8, inserting the scent material into main cavity 1, and closing access door 8, making sure to secure latch 10 into slot 2. When in use, dispenser 20 connects to fishing line 21 just above the fisherman's hooks and/or sinker so as not to get caught by the hooks. In some embodiments, depending on the material used for construction, dispenser 20 may be slightly buoyant to keep dispenser 20 just above the hooks. Dispenser 20 is reversible; it can be placed on fishing lines 19A and 19B or pulled through the water in either direction to successfully release the scent. This achieved at least because the entire design working together creates a hydrodynamic flow package that allows for the unit to work in a forward or reverse manner, without significant wobble. In most applications, without the strategically aligned curved-blade design fins taught by an embodiment of the present invention, with one fin wound in a forward direction, the other fin wound in the opposite direction, those units would wobble and be unusable in a reverse manner. If it had only one forward blade, it would not be reversible either. Most conventional fishing lures that have fins, only have a front fin because they are mostly flat bladed and create too much drag to use two blades, which would not work properly in a reverse manner.

Dispenser 20 can be used by any individual fisherman who is doing bottom type fishing or jigging type fishing, for example, without limitation, a fisherman sitting on a lakeside, a fisherman on a river bank, a bottom fisher from a boat, a surf fisher, or an ice fisher.

Dispenser 20 is made of durable materials so as to last a long time for the user. Main cavity 1, along with access door 8, and front fin section 11A, and the rear fin section 11B, may be manufactured from injection-molded plastic, formed metal or any other suitable materials capable of resisting both fresh and salt water damage, such as, but not limited to, other types of plastics, ceramics, etc. Size variations of the invention may accommodate different types of fishing or different types of fish being caught. Leader 16 may be made from a non-corrosive metal material, wire, nylon or any other suitable material. Swivel-type mechanisms 18A and 18B and rings 17A and 17B, as used separately from the invention are available commercially. In some embodiments swivel mechanisms 18A and 18B may be specifically designed and manufactured to be an integral part of dispenser 20, using any suitable material, for the manufacturing process. In the preferred embodiment, dispenser 20 is slim with a baitfish like appearance. Dispenser 20 can be made in dark colors to more resemble a baitfish, or it may be made in any color associated with fishing lures.

Having fully described at least one embodiment of the present invention, other equivalent or alternative methods of implementing an inline rotating chum or fish scent dispenser, according to the present invention, will be apparent to those skilled in the art. The invention has been described above by way of illustration, and the specific embodiments disclosed are not intended to limit the invention to the particular forms or components disclosed therein. The invention is thus to cover all of modifications, equivalents, and alternatives falling within the spirit and scope of the following claims.

What is claimed is:

1. A device capable of dispensing chum or fish scent comprising:
    a cylindrical housing having a longitudinal axis, the housing comprising:
        a first end and a second end opposite the first end;
        a cylindrical cavity configured to receive chum or fish scent; and
        a plurality of holes configured to enable release of at least some of the chum or fish scent from the cavity;
    a fin unit connected to each of the first end and the second end of the housing, each fin unit extending away from the housing in a direction substantially parallel to the longitudinal axis, and each fin unit comprising at least one fin projecting from the fin unit in a direction substantially perpendicular to the longitudinal axis to uniformly rotate the entire device in response to water flow over the at least one fin; and wherein rotation of the entire device results in release of at least some of the chum or fish scent from the cavity through the plurality of holes.

2. The device of claim 1, farther comprising a swivel mechanism connected to each fin unit, the swivel mechanism being configured to be connected to a fishing line and configured to permit the entire device to rotate without twisting the fishing line.

3. The device of claim 2, wherein each swivel mechanism comprises a barrel-type swivel mechanism and a ring to connect the barrel-type swivel mechanism to the fishing line.

4. The device of claim 2, further comprising a leader connected to the swivel mechanism and extending along the longitudinal axis through the housing and each fin unit, the leader being configured to permit rotational movement of the entire device about the longitudinal axis.

5. The device of claim 2, wherein either swivel mechanism and corresponding fin unit is connectable to a fishing line having at least one of a hook, a sinker, or a lure.

6. The device of claim 1, wherein the housing comprises an access door to permit access to the cavity and a latch mechanism to hold the access door in a closed position.

7. The device of claim 6, wherein the access door comprises a hinge at each end of the housing, each fin unit comprises a hinge pin for a corresponding hinge of the access door, the hinge pin extending from the fin unit through the corresponding end of the housing and into the cavity to mate with the corresponding hinge of the access door.

8. The device of claim 1, wherein the housing further comprises a first end wall proximate to the first end of the housing and a second end wall proximate to the second end of the housing, and each fin unit is detachably connected to a corresponding end wall of the housing.

9. The device of claim 1, wherein the at least one fin of the fin unit comprises a plurality of fins disposed substantially symmetrically on the fin unit, each fin of the plurality of fins has a curved blade configuration with a convex side and a concave side.

10. The device of claim 1, wherein the plurality of holes are disposed to cover substantially the entire cylindrical surface area of the housing and configured to permit water to flow into and out of the cavity to enable the chum or fish scent to be released from the cavity.

11. The device of claim 1, further comprising a leader extending along the longitudinal axis through the housing and each fin unit, the leader being configured to permit rotational movement of the entire device about the longitudinal axis.

12. An inline chum or fish scent dispenser comprising:
a substantially cylindrical housing having a longitudinal axis, the housing comprising:
a first end and a second end opposite the first end;
a cavity configured to receive chum or fish scent;
a plurality of holes configured to enable release of at least some of the chum or fish scent from the cavity;
an access door, the access door having a width substantially equal to a diametrical width of the cavity and a length parallel to the longitudinal axis substantially equal to a length of the cavity parallel to the longitudinal axis, and the access door comprising a latch and at least one hinge disposed in the cavity, the at least one hinge being configured to permit rotation of the access door for access to the cavity; and
a slot to receive the latch and hold the access door in a closed position;

a bladed unit connected to each of the first end and the second end of the housing and extending away from the end of the housing in a direction substantially parallel to the longitudinal axis, each bladed unit comprising at least one blade projecting from the bladed unit in a direction substantially perpendicular to the longitudinal axis to generate a uniform rotational torque onto the entire dispenser in response to water passage over the at least one blade;

a swivel mechanism connected to each bladed unit, the swivel mechanism being configured to be connected to a fishing line and configured to permit the entire dispenser to rotate without twisting the fishing line; and wherein rotation of the entire dispenser generates centrifugal forces and results in release of at least some of the chum or fish scent from the cavity through the plurality of holes.

13. The dispenser of claim 12, wherein the bladed units are detachably connected to corresponding ends of the housing.

14. The dispenser of claim 12, wherein the at least one blade of the bladed unit comprises a plurality of blades disposed substantially symmetrically on the bladed unit, each blade of the plurality of blades has a curved configuration with a convex side and a concave side.

15. The dispenser of claim 12, wherein the plurality of holes are configured to permit water to flow into and out of the cavity during rotation of the entire dispenser to enable the chum or fish scent to be released from the cavity.

16. A chum or fish scent dispenser comprising:
a housing having a longitudinal axis, the housing comprising:
a first end wall and a second end wall opposite the first end wall;
a cavity configured to receive chum or fish scent;
a plurality of holes configured to enable release of at least some of the chum or fish scent from the cavity;
an access door to permit access to the cavity; and
a first fin unit connected to the first end wall of the housing, a second fin unit connected to the second end wall of the housing, each of the first fin unit and the second fin unit comprising at least one fin projecting from the fin unit in a direction substantially perpendicular to the longitudinal axis to rotate the entire dispenser in response to flow of water over the at least one fin of the corresponding fin unit, the first fin unit and the second fin unit each being configured to uniformly rotate the entire dispenser in response to the dispenser being pulled through water in either a forward direction or a reverse direction;
a swivel mechanism connected to each of the first fin unit and the second fin unit, the swivel mechanism being configured to be removably connected to a fishing line and configured to permit the entire dispenser to rotate without twisting the fishing line; and
wherein rotation of the entire dispenser results in release of at least some of the chum or fish scent from the cavity through the plurality of holes.

17. The dispenser of claim 16, wherein the at least one fin of each of the first fin unit and the second fin unit has a curved blade configuration with a convex side and a concave side and the at least one fin of each of the first fin unit and the second fin unit is disposed separate from the housing.

18. The dispenser of claim 16, wherein the plurality of holes are configured to permit water to flow into and out of the cavity during rotation of the entire dispenser to enable the chum or fish scent to be released from the cavity.

19. The dispenser of claim 16, further comprising a leader connected to the swivel mechanisms and extending along the longitudinal axis through the housing and each of the first fin unit and the second fin unit, the leader being configured to permit rotational movement of the entire device about the longitudinal axis.

20. The dispenser of claim 16, wherein either swivel mechanism and corresponding fin unit is connectable to a fishing line having at least one of a hook, a sinker, or a lure.

* * * * *